US005666661A

United States Patent [19]
Grube et al.

[11] Patent Number: 5,666,661
[45] Date of Patent: Sep. 9, 1997

[54] METHOD FOR AUTOMATICALLY BYPASSING THE USE OF A COMMUNICATION SYSTEM INFRASTRUCTURE

[75] Inventors: Gary W. Grube, Palatine; Marc C. Naddell, Schaumburg; Mark L. Shaughnessy, Algonquin, all of Ill.

[73] Assignee: Motorola, Inc., Schaumburg, Ill.

[21] Appl. No.: 562,940

[22] Filed: Nov. 27, 1995

Related U.S. Application Data

[63] Continuation of Ser. No. 209,029, Mar. 10, 1994, abandoned.
[51] Int. Cl.$^6$ ........................................................ H04B 7/00
[52] U.S. Cl. ............................ 455/509; 455/63; 455/517
[58] Field of Search .................................. 455/34.1, 34.2, 455/54.1, 54.2, 56.1, 62, 63, 33.2; 379/59, 60

[56] References Cited

U.S. PATENT DOCUMENTS

| | | | |
|---|---|---|---|
| 4,553,263 | 11/1985 | Smith et al. | 455/54.1 |
| 5,126,733 | 6/1992 | Sagers et al. | 340/825.47 |
| 5,247,567 | 9/1993 | Hirano | 455/54.1 |
| 5,293,634 | 3/1994 | Wilson et al. | 455/54.1 |
| 5,313,652 | 5/1994 | Rozenstrauch et al. | 455/34.1 |
| 5,423,055 | 6/1995 | Diaz et al. | 455/17 |

Primary Examiner—Edward F. Urban
Attorney, Agent, or Firm—Christopher P. Moreno

[57] ABSTRACT

Within a communication system (100), a communication can be switched from a system mode of operation to a direct mode of operation when the distance relationship between the units (102, 103) involved in the communication is obtained. Having obtained the distance relationship between the units (102, 103), that distance is compared with a predetermined threshold. When the distance relationship is favorable with respect to the threshold, the communication is transferred to a direct mode of operation. If however the distance relationship is unfavorable to the threshold, the communication stays on the system communication resource.

5 Claims, 3 Drawing Sheets

METHOD FOR AUTOMATICALLY BYPASSING THE USE OF A COMMUNICATION SYSTEM INFRASTRUCTURE

This is a continuation of application Ser. No. 08/209,029, filed Mar. 10, 1994 and now abandoned.

FIELD OF THE INVENTION

This invention relates generally to communication systems and, in particular, to a change in communication modes.

BACKGROUND OF THE INVENTION

Communication systems are known to include a communication resource controller, a plurality of communication units, and communication resources that are transceived via base stations or repeaters. In such communication systems, the communication units communicate with each other via the communication resources, where a communication resource may be an RF channel, a pair of RF channels, a TDM slot, or any medium for carrying RF signals. To initiate a communication, a communication unit transmits a communication request to the communication resource controller via a communication resource dedicated for control information (control channel). The communication request includes a request for a particular service, such as allocation of a communication resource and the identity of a target communication unit, or units. For example, the request may be for a group call which identifies all the communication units in the same group as the initiating communication unit.

The communication request is received by the control channel repeater and routed to the communication resource controller. Upon receipt of the request, the communication resource controller determines whether the communication unit is authorized to access the system and, if so, grants the request. Having granted the request, the communication resource controller allocates a communication resource, and the associated base station, to the initiating communication unit and the target communication units, and then transmits a communication resource allocation message on the control channel. All communication units within the coverage area of the control channel antenna receives the allocation message. However, only the communication units identified in the message, i.e., the initiating and target communication unit, will access the allocated communication resource and subsequently partake in the communication.

This method of communication resource allocation works very well in many trunking communication system applications, however, because there is a limited number of communication resources, this method has its limitations. For example, assume that a particular communication group is involved in a group call which is being supported on a communication resource. Further assume that all the members of the communication group call are within close proximity. In this instance, if the communication units could transceive information directly to one another, a system communication resource could be reserved for another system call.

Motorola provides a dual mode communication unit, i.e., one that operates on either a system communication resource or in a direct mode. This unit allows the user to exclusively operate his or her communication unit in either the direct mode or the system mode. To switch from one mode to the other, this unit must be manually adjusted, thus it does not resolve the above mentioned problem.

Therefore, a need exists for an automatic method of changing communication modes from a communication system supported mode to a direct mode of communication.

DESCRIPTION OF A PREFERRED EMBODIMENT

Generally, the present invention provides a method that allows for changes in communication modes. This is accomplished when a communication resource controller determines the location of communication units that are engaged in a communication. When the distance relationship between the units is relatively small, the communication resource controller transmits a mode change message to the units. Upon receiving the mode change message, the communication units change their operating mode from one of a system communication resource to one of a direct mode resource. With such a method, system communication resources may be more efficiently utilized by switching communications of short distance to a direct mode while reserving the system communication resources for wide range communications.

Figure 1:
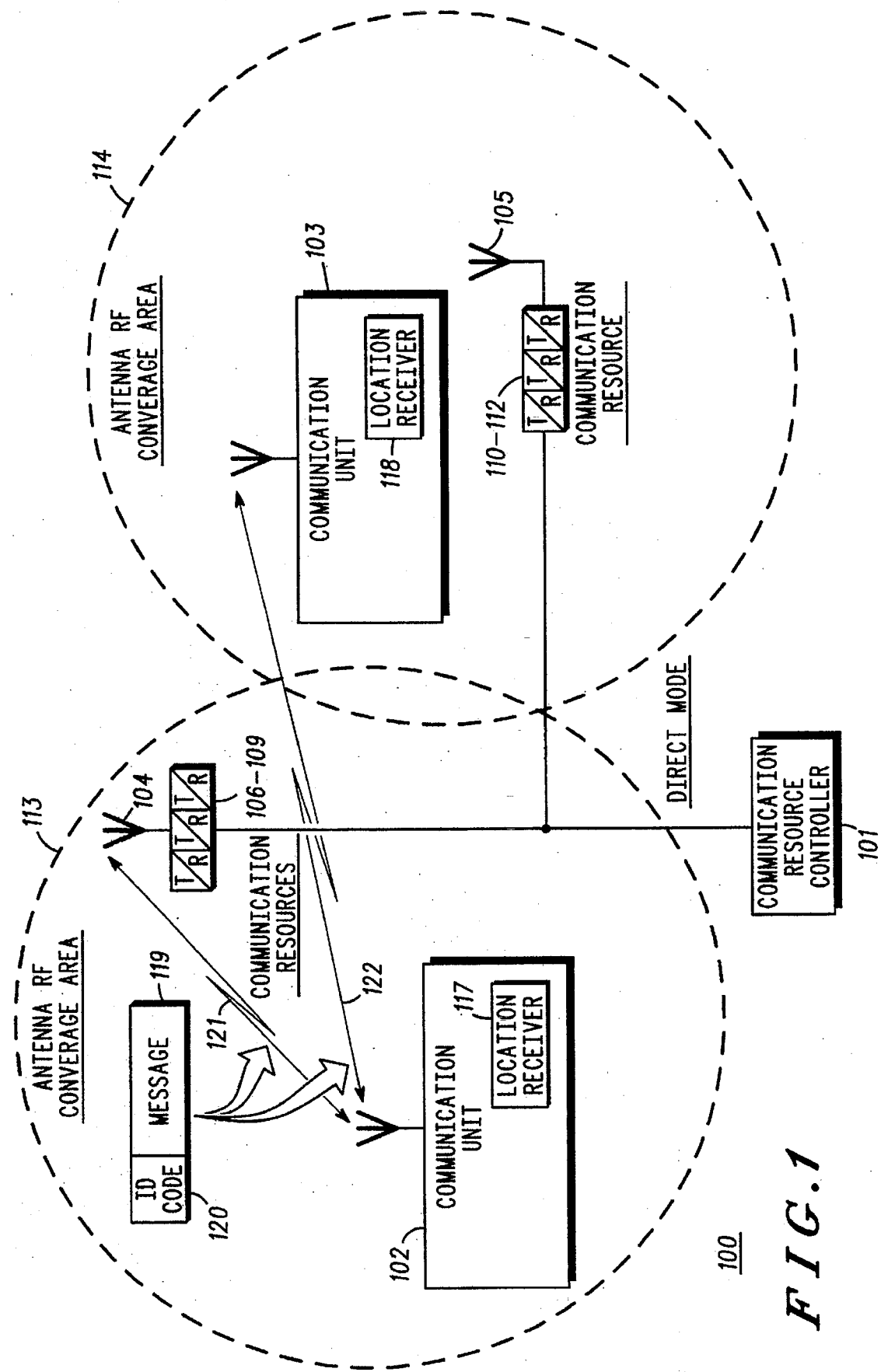
FIG. 1 illustrates a communication system that includes the present invention.

The present invention can be more fully described with reference to FIGS. 1–3. FIG. 1 illustrates a communication system that includes a communication resource controller (101), a plurality of communication traits (102, 103), a plurality of antennas (104, 105), a limited number of system communication resources (106–112), and a direct mode communication resource (122). Each of the antennas (104, 105), which may be incorporated into a base station such as Motorola QUANTAR™, has an RF coverage area (113, 114). Each of the communication units (102, 103) includes a location receiver (117, 118) which may be a global positioning satellite (GPS) receiver that is coupled to a communication processor (not shown).

Within the communication system 100, any of the communication units (102, 103) may initiate a communication by transmitting a message (119) and an identification code (120). This message (119) may indicate a particular communication request, such as a group call, or private call, where the identification code may indicate an individual unit's code or a group code. Regardless of whether the request is for a private call or a group call, the communication resource controller (101) identifies the target communication unit or units by the identification code. Knowing the initiating and target communication units, the communication resource controller (101) can then determine the geographic locations of each of the communication units. With this information, the resource controller can then determine the geographic separation of the units. If the geographic separation is greater than a predetermined distance, the communication resource controller (101) allocates a system communication resource (106–112) to the units. If the geographic separation is less than the predetermined distance, the communication resource controller (101) transmits, on the control channel, a direct mode message to the units, wherein the direct mode message instructs the units to use the direct mode communication resource (122).

Figure 2:
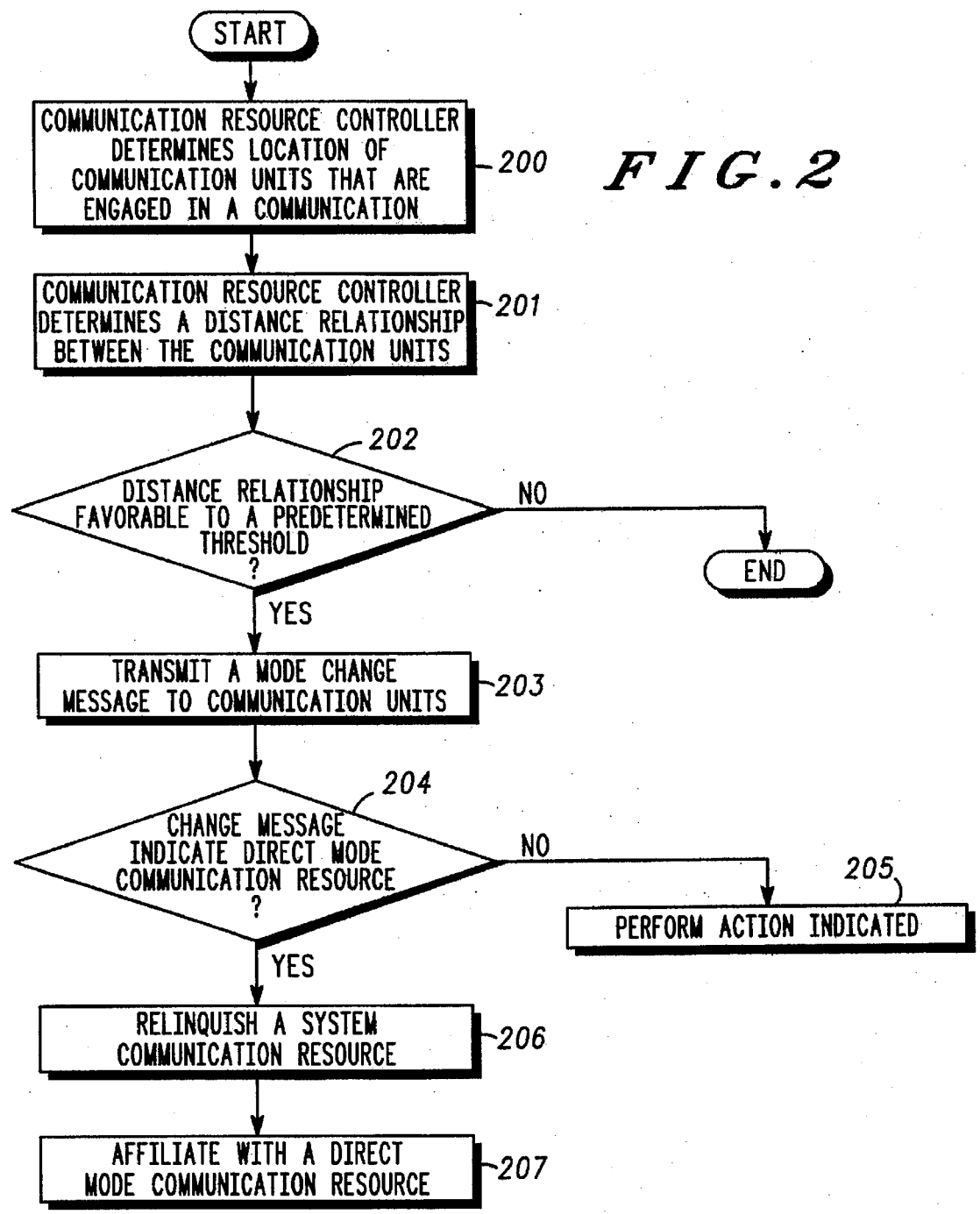
FIG. 2 illustrates a logic diagram that may be used to implement the present invention.

To further illustrate the present invention, consider the logic diagram of FIG. 2. At step (200), the communication resource controller determines the location of communication units that are engaged in a communication. Again, the units that are engaged in a communication may be actively communicating or in the process of initiating a communication. Having obtained the location, the communication resource controller then determines a distance relationship between the communication units (201). The distance relationship is readily calculated from the geographic coordinates of the units' location and may be defined in a variety of ways. For example, the distance relationship may be a maximum distance between units involved in the communication or, for a group call, a distance between the initiating unit and the identified target units. Note that in a group call, other members of the same group may participate in the call, even if they weren't identified as target units.

Having obtained the distance relationship, the communication resource controller then determines whether that relationship is favorable to a predetermined threshold (202). The predetermined threshold is typically a distance parameter which is derived from the transmitting power of the communication units when in a direct mode. For example, Motorola's dual mode radios have a direct mode transmitting range of 0.5 miles to 5 miles. Thus if the distance relationship is greater than 5 miles, the communication units are going to need to remain on, or be granted, a communication system resource.

If the distance relationship is favorable to the predetermined threshold (202), the communication resource controller transmits a mode change message, or a direct mode message, to the communication units (203). The mode change message indicates that the units should switch to, or operate in, a direct mode of operation. Alternatively, the change mode message may indicate that the communication units may lower their transmitting power but still remain on a communication system resource or it may indicate that the units should increase their transmitting power.

Upon receiving the mode change message, the communication units determine the action indicated (204). If the mode change message does not indicate a direct mode, the communication unit performs the action indicated (205). If, however, the action requires a direct mode of operation, the communication units relinquish the system communication resource (206), if presently operating on a system communication resource, and subsequently affiliate with a direct mode communication resource (207). To affiliate with the direct mode communication resource, the communication units change their receiver and transceiver frequencies to a predefined frequency, i.e., direct mode communication resource. Step 206 is skipped if the units are just commencing a communication.

Figure 3:
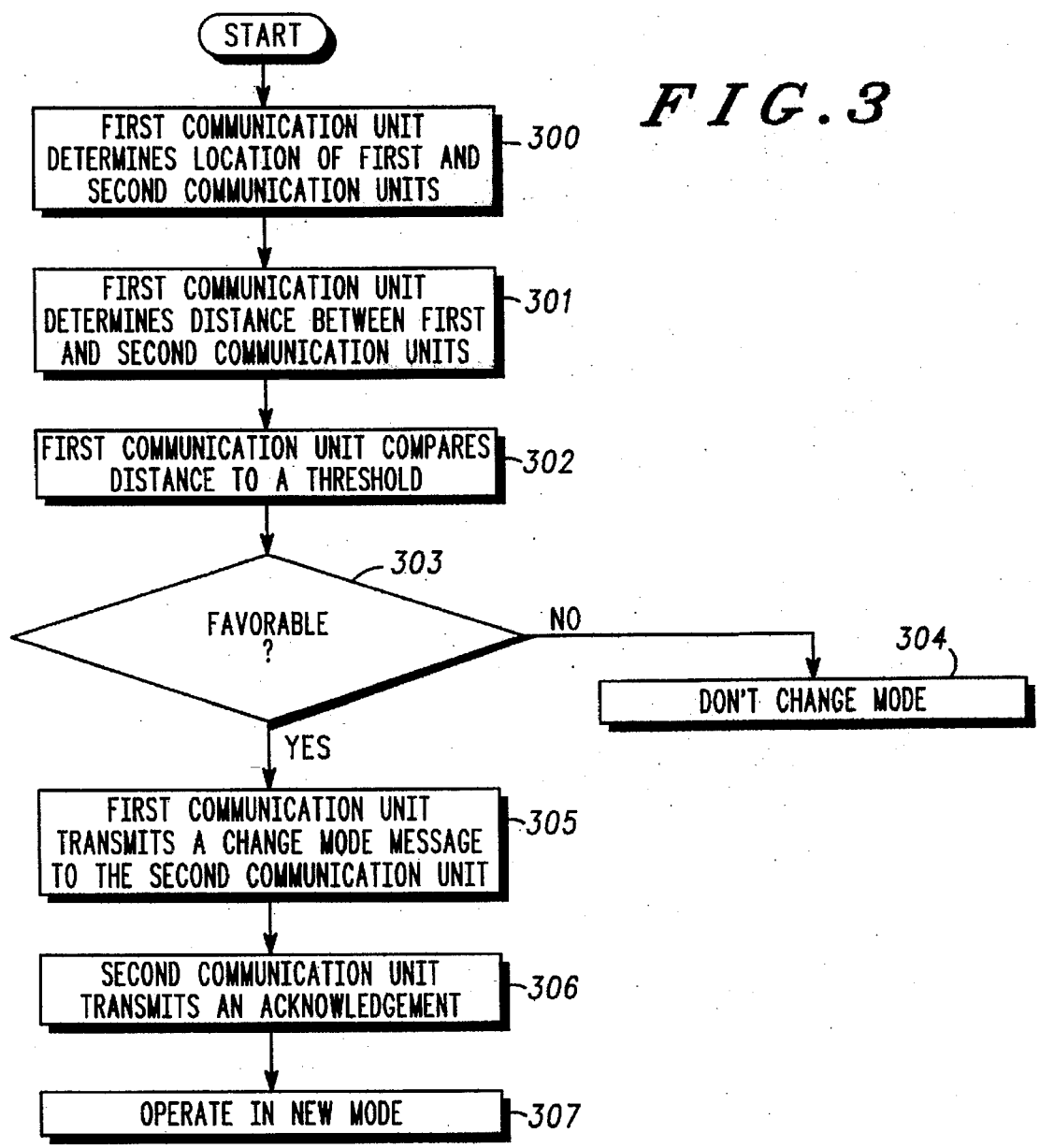
FIG. 3 illustrates a logic diagram that a communication unit may use to implement the present invention.

As an alternative to the communication resource controller making these determinations, FIG. 3 illustrates a logic diagram that may be incorporated into a communication unit to implement the present invention. At step (300), a first communication unit determines its location and the location of a second communication unit. The determination process is similar to that described above, wherein each of the communication units, via its location receiver, determines its geographic coordinates which can be conveyed readily over an RF channel to the other unit. Upon obtaining the locations of the units, the first communication unit then determines a distance between the first and second communication units (301). Having obtained the distance, the communication unit compares this distance to a predetermined threshold (302). If the distance is not favorable to the predetermined threshold (303), the communication units do not change to, or affiliate with, a direct mode communication resource (304).

If, however, the distance is favorable to threshold (303), the first communication unit transmits a change mode message to the second communication unit (305). Upon receiving this message, the second communication unit transmits an acknowledgment (306). Once the acknowledgment has been transmitted and received, operation in the direct mode proceeds (307).

The present invention provides a method for changing communication modes of operation from a system mode to a direct mode. With such a method, system communication resources can be more efficiently utilized by automatically switching communications that are occurring in a small geographic area to a direct mode of communication. Thus increasing overall system efficiency and providing better service to the system users.

We claim:

1. A method for changing communication modes, the method comprising the steps of:

a) determining, by a communication resource controller, the geographic locations of communication units engaged in a communication using a system communication resource;

b) determining, by the communication resource controller, a distance relationship between the communication units, based on the geographic locations of the communication units;

c) determining, by the communication resource controller, whether the distance relationship is favorable with respect to a predetermined threshold;

d) when the distance relationship is favorable, transmitting, by the communication resource controller, a mode change message; and e) upon receiving the mode change message, performing, by the communication units, an action identified in the mode change message, including relinquishing the system communication resource, and affiliating with a direct mode communication resource, wherein the direct mode communication resource is not the system communication resource.

2. In the method of claim 1, step (e) further comprises performing the action by adjusting transmit power levels of the communication units, based on the distance relationship.

3. A method for changing communication modes, the method comprising the steps of:

a) determining, by a first communication unit, a geographic location of a first communication unit and a geographic location of a second communication unit, wherein the first communication unit and the second communication unit are engaged in a communication using a system communication resource;

b) determining, by the first communication unit, a distance relationship between the first communication unit and the second communication unit, based on the geographic location of the first communication unit and the geographic location of the second communication unit;

c) determining, by the first communication unit, whether the distance relationship is favorable with respect to a predetermined threshold;

d) when the distance relationship is favorable, transmitting, by the first communication unit, a mode change message to the second communication unit;

e) transmitting, by the second communication unit, an acknowledgment upon receipt of the mode change message; and f) performing an action identified in the mode change message by the first communication unit and the second communication unit, including relinquishing the system communication resource, and affiliating with a direct mode communication resource, wherein the direct mode communication resource is not the system communication resource.

4. In the method of claim 3, step (f) further comprises performing the action by adjusting transmit power levels of the communication units.

5. In a communication system having a first communication unit engaged in a communication, using a system communication resource, with a second communication unit, the first communication unit having a first location, the second communication unit having a second location, and there being a distance relationship between the first communication unit and the second communication unit, the distance relationship being based on the first location and the second location, a method for the first communication unit to change communication modes, the method comprising the steps of:

a) receiving a mode change message, the mode change message being based on the distance relationship, wherein the mode change message includes an action;

b) adjusting the transmit power level of the first communication unit, when the action indicates a power adjustment;

c) relinquishing the system communication resource when the action indicates a direct mode operation; and d) affiliating with a direct mode communication resource when the action indicates the direct mode operation, wherein the direct mode communication resource is not the system communication resource.

* * * * *